(12) United States Patent
Gananathan

(10) Patent No.: US 6,511,185 B1
(45) Date of Patent: Jan. 28, 2003

(54) METHOD AND APPARATUS FOR COMPENSATING A PROJECTED IMAGE

(75) Inventor: Ravi K. Gananathan, Scarborough (CA)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/563,289

(22) Filed: May 3, 2000

(51) Int. Cl.⁷ .............................................. G03B 21/14
(52) U.S. Cl. .......................... 353/69; 348/746; 353/121
(58) Field of Search ........................... 353/69, 70, 121; 348/745, 746, 747

(56) References Cited

U.S. PATENT DOCUMENTS

| | | | | |
|---|---|---|---|---|
| 4,422,153 A | * | 12/1983 | Arai et al. ................... 364/525 |
| 5,465,121 A | * | 11/1995 | Blalock et al. .............. 348/744 |
| 5,548,357 A | * | 8/1996 | Appel et al. ................... 353/69 |
| 5,664,858 A | * | 9/1997 | Woo ............................. 353/69 |
| 5,752,758 A | * | 5/1998 | Woo ............................. 353/69 |
| 5,795,046 A | * | 8/1998 | Woo ............................. 353/69 |
| 6,305,805 B1 | * | 10/2001 | Liebenow .................... 353/69 |

* cited by examiner

Primary Examiner—William Dowling
(74) Attorney, Agent, or Firm—Vedder, Price, Kaufman & Kammholz

(57) ABSTRACT

An apparatus for compensating a projected image employs a projected image compensator, such as a suitably programmed graphics processor or other processing device, and receives projection display compensation parameters to perform electronic projected image correction based on the received projection on display compensation parameters. The projected image compensator obtains stored final image data, such as data finally rendered by a 2D or 3D graphics engine, that has been stored in a frame buffer, and performs scaling of the final image data to produce projection compensated final image data. In one embodiment, the projection compensated final image data is stored back in the frame buffer memory and then output under control of a display controller. In another embodiment, the projection compensated final image data is not returned back to the frame buffer memory.

16 Claims, 5 Drawing Sheets

METHOD AND APPARATUS FOR COMPENSATING A PROJECTED IMAGE

FIELD OF THE INVENTION

The invention relates generally to methods and apparatus for projecting electronically stored images, and more particularly to methods and apparatus for electronically compensating a projected image.

BACKGROUND OF THE INVENTION

Typically, when a digital image is projected onto a wall using a projector the projected image appears slanted (i.e. not a perfect rectangle) as the axis of the light source is not perpendicular to the projection wall or screen. For example, the projector may be placed on a table so that the image is projected upwards onto a wall or screen, or may be mounted on a ceiling so that the image is projected downwards onto a wall or screen. This can result in a "pyramidal effect." With the increased use of stored digital images and digitally converted or processed images from other media such as films, negatives, etc, projecting the images, for example, directly from a laptop computer or another image source becomes very convenient. However, if not compensated properly either by a mechanical or by an electrical/electronic means—the pyramidal effect becomes very pronounced especially when the projected image is large, thereby making the distortions more problematic.

Several mechanical solutions have been proposed. One solution involves tilting the screen to be perpendicular to the projection axis of the projector. However, this requires the expense and manipulation of a special tiled screen. Oftentimes, only flat walls or flat screens are available. In addition, optical solutions have been proposed that require a projector to have special lens arrangements to compensate for the pyramidal effect. However, such optical lens arrangements can be very expensive and can add to the weight and cost of projectors. In addition, different lenses may be required for different projector types.

In addition, graphics processors are known which perform ratiometric expansion on finally rendered information from a frame buffer and then output the ratiometrically expanded (scaled) image on a display device such as a laptop display or other suitable display. However, the scaled image is typically not re-stored in the frame buffer for display. In addition, the ratiometric expansion provides the same amount of scaling applied to every display line. Accordingly, such ratio metric expanders are typically not adapted for pyramidal effect compensation.

Another optical solution that may be used includes the use of a mirror to provide a reflection at an angle perpendicular to the display surface. Again, this requires special lens construction.

Consequently, a need exists for a method and apparatus to compensate a projected image that provides electronic compensation to allow compensation of the image at the source.

DETAILED DESCRIPTION OF A PREFERRED EMBODIMENT OF THE INVENTION

An apparatus for compensating a projected image employs a projected image compensator, such as a suitably programmed graphics processor or other processing device, and receives projection display compensation parameters to perform electronic projected image correction based on the received projection on display compensation parameters. The projected image compensator obtains stored final image data, such as data finally rendered by a 2D or 3D graphics engine, that has been stored in a frame buffer, and performs scaling of the final image data to produce projection compensated final image data. In one embodiment, the projection compensated final image data is stored back in the frame buffer memory and then output under control of a display controller. In another embodiment, the projection compensated final image data is not returned back to the frame buffer memory.

In one embodiment, the projection display compensation parameters are received through a user interface, such as a graphics user interface or other suitable interface. The projection display compensation parameters include data such as an amount and direction of compensation, and an angle of image plane rotation s (where a 3D engine is used), to effect compensation. In one embodiment, a graphics rendering engine, such as a two dimensional or three dimensional rendering engine, performs non-linear scaling in a per line basis of final image data to produce the projection compensated final image data. Accordingly, a "finally rendered image" is again modified or processed to compensate for projector distortion, or any other distortion resulting from projecting an image so that the final projected image appears to be suitably undistorted. A finally rendered image refers to the rendered image before correction. That is, this would have been the image sent to the projector if compensation for projection was unavailable.

Figure 1:
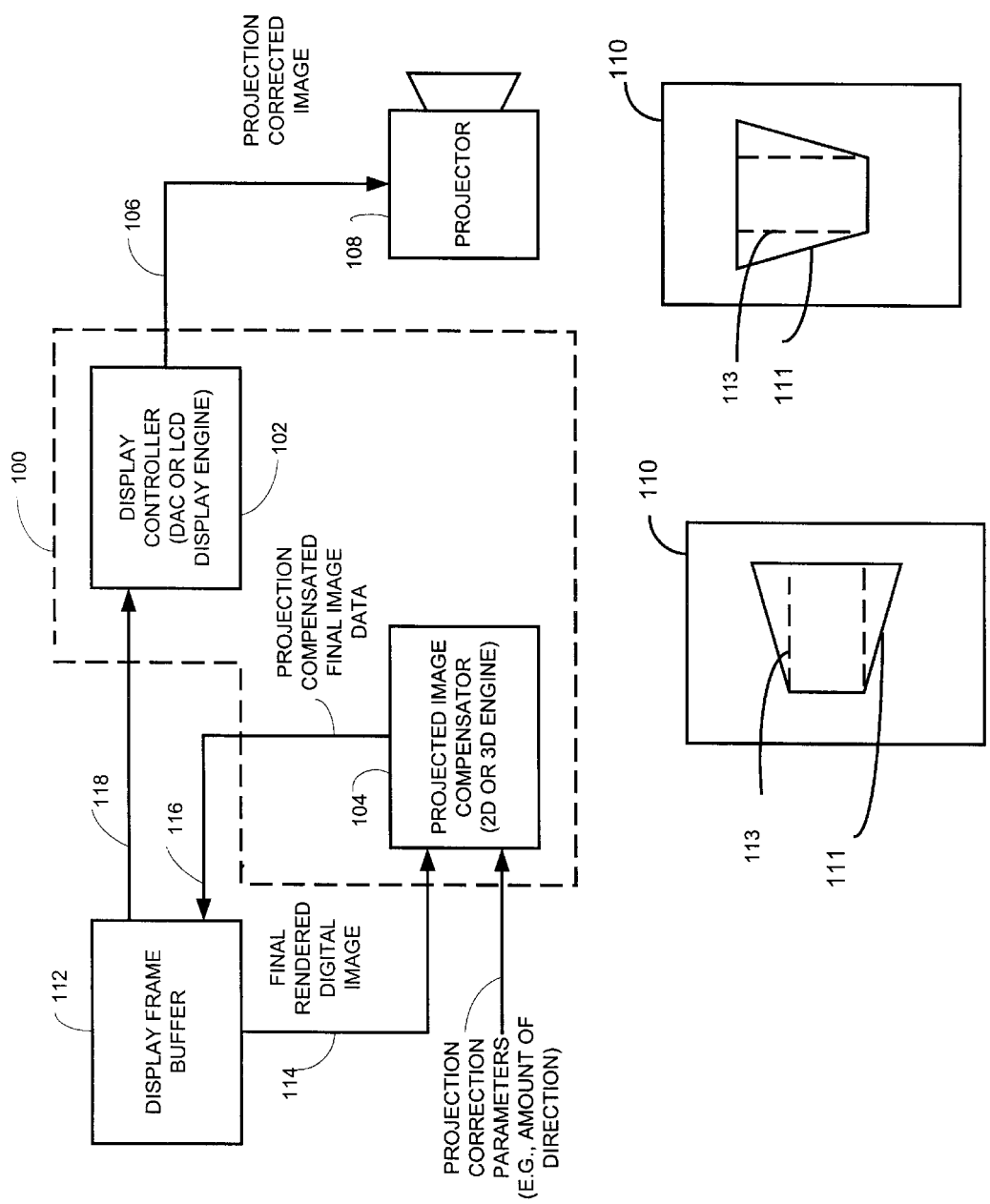
FIG. 1 is a block diagram illustrating one example of an apparatus for electronically compensating an image in accordance with one embodiment of the invention.

FIG. 1 shows one example of an apparatus 100 for compensating a projected image wherein the apparatus 100 includes a display controller 102 and a projected image compensator 104. The apparatus 100 may be a suitably programmed graphics processor or any suitable hardware and/or software combination. The apparatus 100 outputs image data 106 that has been compensated for distortions caused by projector 108 on a projection surface 110, such as a screen or wall. In this embodiment, the projected image compensator 104 is operatively coupled to the display controller 102 through a display frame buffer 112.

The display controller 102 may be any conventional display controller, such as a digital to analog converter, a liquid crystal display (LCD), display engine or any other suitable display controller that outputs pixel information. The projected image compensator 104 may be a two dimensional or three dimensional graphics processing engine that utilizes the display frame buffer 112 to store final rendered digital images, as known in the art. The final rendered digital image 114 is received by the projected image compensator 104 prior to being displayed on projector 108.

The projected image compensator 104 obtains the stored final image data 114 from the frame buffer memory 112 and performs nonlinear scaling of the final image data 114 to produce projection compensated final image data 116. The projected image compensator 104 stores the projection compensated final image data 116 back into the frame buffer memory 112. The display controller 104 obtains the projection compensated final image data 116 and outputs it as the projection corrected image 106 for projection by projector 108.

Figure 2:
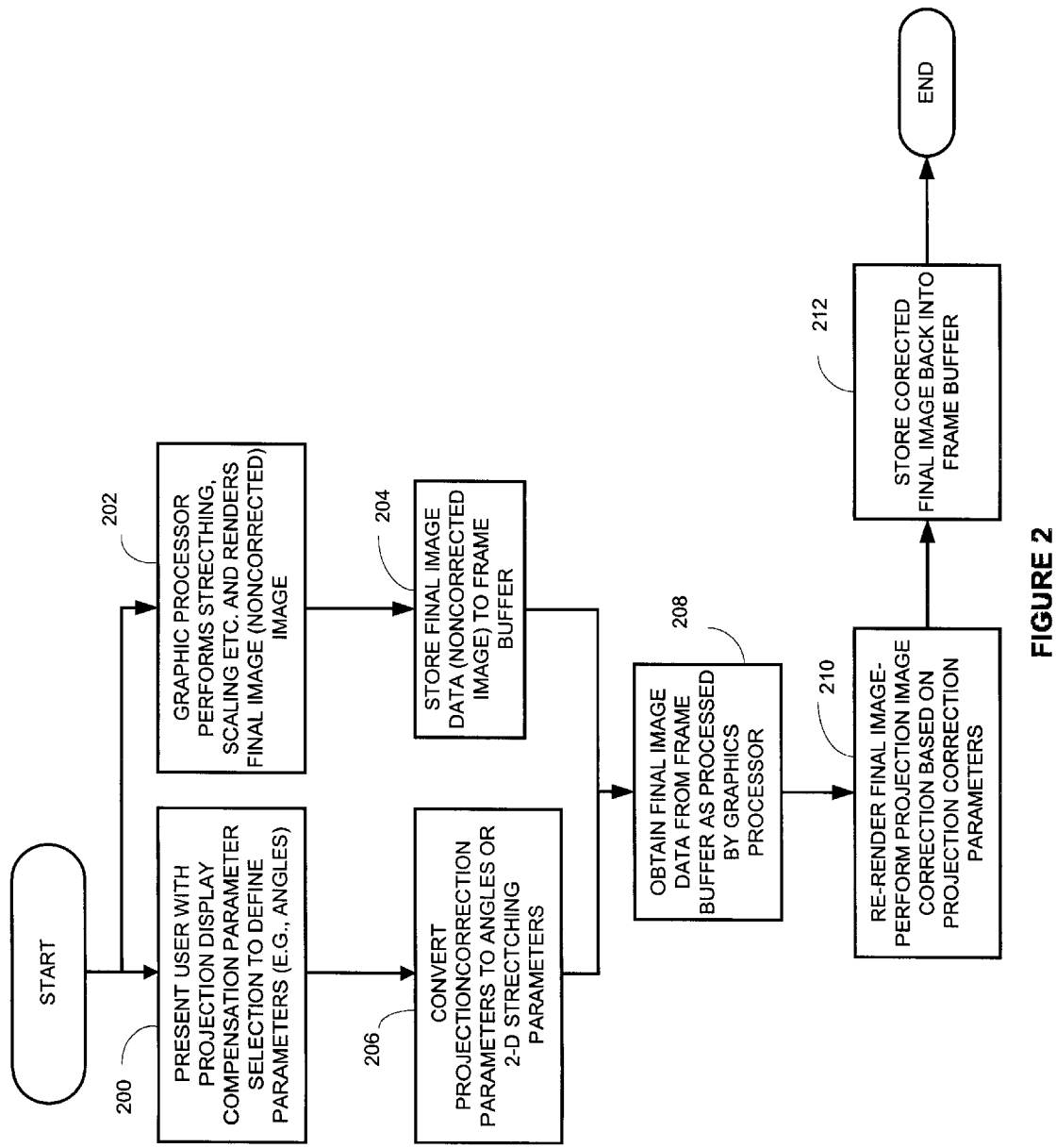
FIG. 2 is a flow chart illustrating one example of a method for compensating a projected image in accordance with one embodiment of the invention.

FIG. 2 shows one example of a method of operation of the apparatus of FIG. 1. The method for compensating a projected image includes presenting a user with a projection display compensation parameter selection interface to allow a user to define projection compensation parameters as shown in block 200. This may be done, for example, through a graphics user interface or other suitable interface. In one example, the interface may be a graphic sliding bar. For example, a horizontal sliding bar may be presented and generated by the apparatus 100 to allow a user to adjust scaling by the projected image compensator in a horizontal direction while viewing the projected image on the projection surface 110. In addition, a second sliding bar may be presented to a user appearing as a vertical bar so that the user may slide a cursor along the vertical bar to vertically adjust scaling of the projected image while viewing the image. Horizontal scaling from the perspective of the projection surface may be desirable where the projector displays a pyramidal effect 111 as shown in FIG. 1. The user may suitably adjust the projected image on a trial and error basis to obtain an optimal projection corrected image 113 in view of the type of projector and projection surface 110. The difference between the dashed lines and the pyramidal effect show the correction of the pyramidal effect to produce a projection corrected image. Vertical scaling from the perspective of the projection surface may be desirable where the projector displays a pyramidal effect 115 as shown in FIG. 1. It will be recognized that mirror image pyramidal effects or combinations of these effects can occur and corresponding corrections can also be made.

The graphic user interface bars allow the selection of an amount and direction of compensation, for example, along a vertical and horizontal direction. In addition, if desired, a three dimensional compensation may also take place allowing an angle of image plane rotation to be performed. The angle of image plane rotation effectively acts as a type of compensation similar to that of tilting a projection screen inwardly or outwardly. This can be applied in both the vertical and the horizontal axes.

As shown in block 202, where the projected image compensator 104 is employed as part of a graphics processor, the graphics processor performs stretching, scaling and other suitable two dimensional or three dimensional rendering of an image to produce the final image data which has not been corrected for projection distortions, but is suitable for display on an LCD or other suitable display device. The graphics processor then stores the rendered final image data to the frame buffer, as shown in block 204. Simultaneously, if desired, the projected image compensator 104 converts the projection correction parameters entered by the user, for example, through the GUI interface into suitable information representing the amount of horizontal or vertical compensation as well as the angle of image plane rotation, if desired. This is shown in block 206. The projected image compensator 104 then performs scaling of the final image data based on the projection correction parameters to produce the projection compensated final image data. If desired, the scaling is preferably a nonlinear scaling on a per line basis so that the pyramidal effect can be suitably reduced. In addition, a partial portion of the final image data may be suitably adjusted if a variable projection image is desired.

Accordingly, as shown in block 208, the method includes obtaining stored final image data from the frame buffer memory, as rendered or processed by the graphics processor. As shown in block 210, the method then includes performing the scaling on a per line basis of the final image to produce the projection compensated final image data. Accordingly, a rerendering (non-linear scaling) of the final image data is performed based on the projection correction parameters entered by the user. The method includes storing the projection compensated final image data back into the frame buffer for display by the projector 108. This is shown in block 212.

Where a graphic user interface is used to input horizontal and/or vertical projection compensation parameters, a host processor under software control converts the graphic user interface input into suitable angle data understood by the projected image compensator 104. The host processor under software control also obtains the final image data from the frame buffer and performs the necessary rotation, if for example, a 3D engine is used, or stretching if two dimensional processing engine is used, to perform the projector image correction. Alternately, if dedicated hardware is designed into the graphics controller this task can be accomplished by the graphics controller instead. This will off load the CPU for other activities.

It will be recognized that the number of pixels per line remains the same. Accordingly there will be a strip of pixels on potentially each line on at least two sides of the projected image that need to be blended with the background color of the projection surface. Color correction can be performed on these pixels to blend it (e.g. match the color) with the color of the projection surface.

It will be understood that if desired, a graphics processing engine may store partially processed image data in a display frame buffer and apply the necessary scaling to produce projection compensated partial image data or a portion of an entire image.

Figure 3:
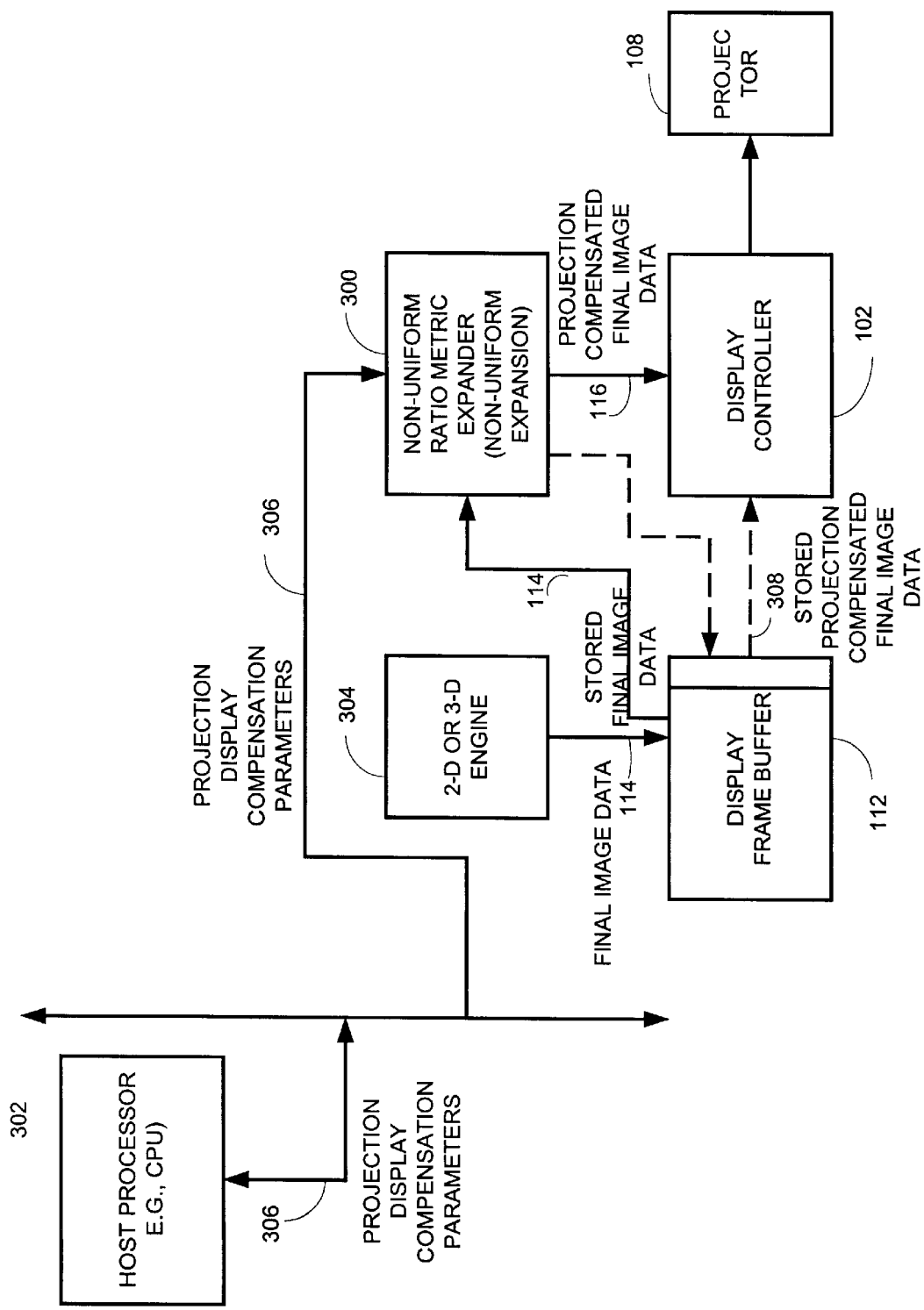
FIG. 3 is a block diagram illustrating one example of an apparatus for compensating a projected image in accordance with one embodiment of the invention.

FIG. 3 shows an alternative embodiment of a projected image compensator in the form of a hardware non-uniform ratiometric expander 300. The hardware non uniform ratiometric expander performs non-linear scaling on a per line basis. Accordingly, one horizontal line may be scaled differently than an adjacent horizontal line to provide, for example, pyramidal effect compensation. Accordingly, a host processor 302 is suitably coupled to a 2D or 3D graphics engine 304 that provides the projection display compensation parameters 306 as entered through a graphics user interface. The projection display compensation parameters 306 after having been suitably translated by the host processor, serve as control input to the hardware non-uniform ratiometric expander 300. The 2D or 3D engine generates the final image data 114 and stores it in the frame buffer 112 as known in the art. However, the non-uniform ratiometric expander, unlike conventional ratiometric expanders, performs a non-uniform expansion on a per line basis on the stored final image data 114 obtained from the display frame buffer. It performs non-uniform ratiometric expansion based on the projection display compensation parameters 306 to produce the projection compensated final image data 116. As shown in this embodiment, the projection compensated final image data 116 is not stored back in the frame buffer but instead is output to the display controller 102 for output to the projector 108. Alternatively, as shown by the dashed lines, the projection compensated final image data 116 may be stored back in the frame buffer and then output to the display controller as stored projection compensated final image data 308.

Figure 4:
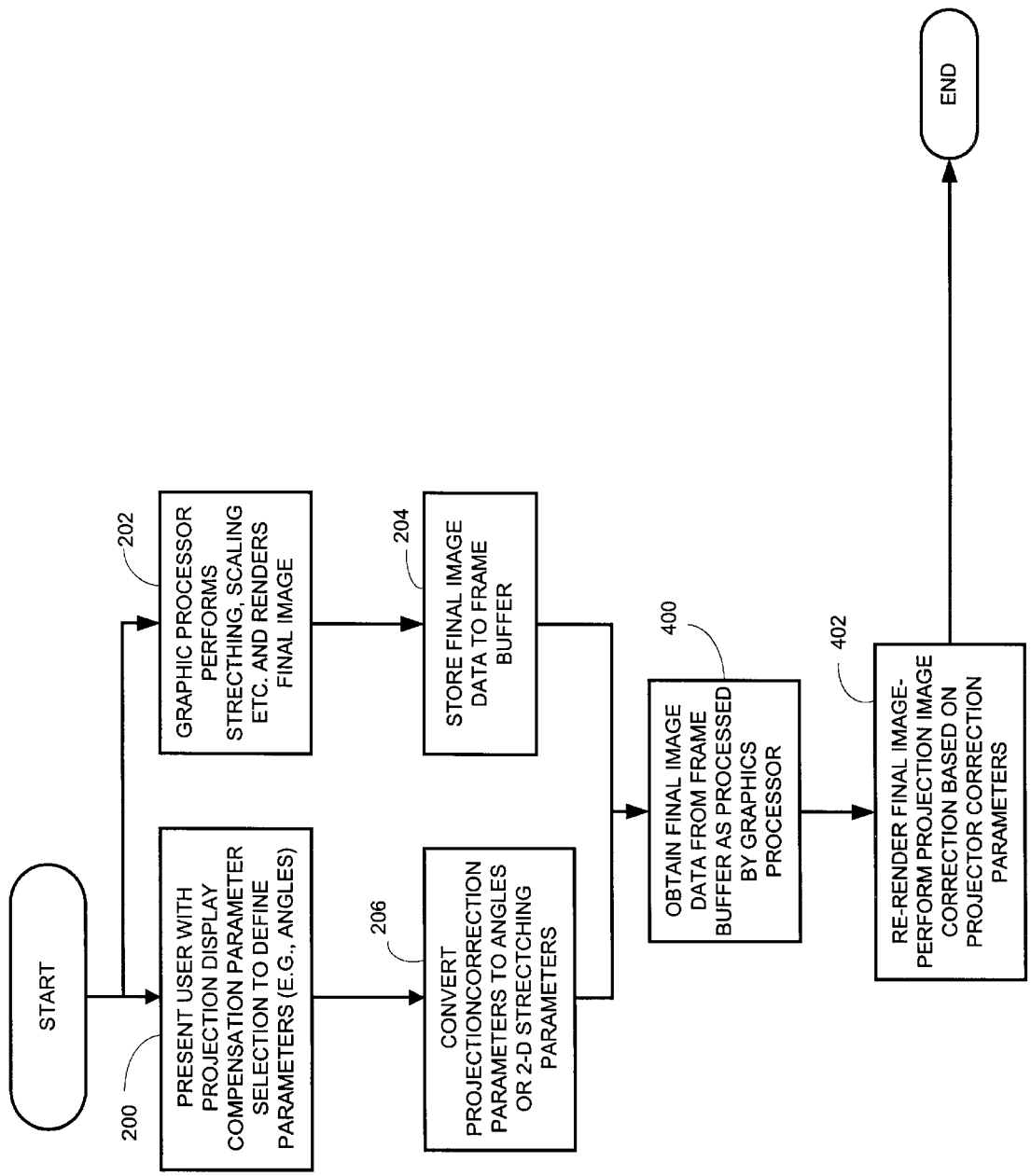
FIG. 4 is a flow chart illustrating another method for compensating a projected image in accordance with another embodiment of the invention.

Accordingly, FIG. 4 shows a method for compensating a projected image which is identical to that shown in FIG. 2 except that block 212 need not be performed and blocks 400 and 402 are performed by the hardware non-uniform ratiometric expander as a separate hardware component as opposed to being employed as part of a 2D or 3D engine as in FIG. 2. It will be understood that when the projection compensated final image data is stored back in frame buffer memory, the frame buffer may be a double buffer so that the projection compensated final image data is stored in a different section of the frame buffer memory than the final image data.

Figure 5:
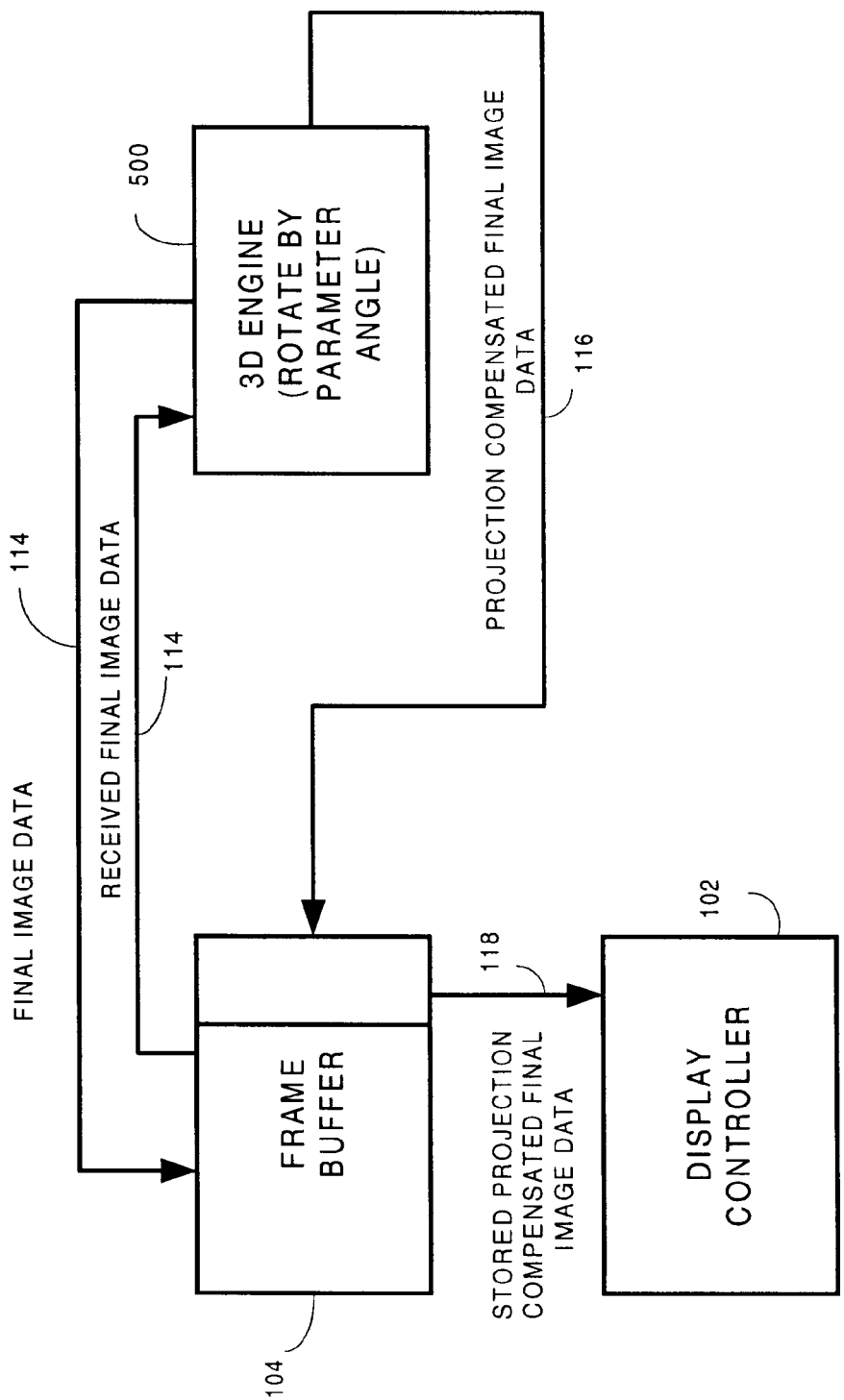
FIG. 5 is an apparatus for compensating a projected image in accordance with one embodiment of the invention.

FIG. 5 illustrates a block diagram of an apparatus for compensating a projected image wherein a three dimensional graphics processing engine 500 is employed. Unlike a 2D engine, that can provide post-rendered horizontal and vertical scaling on a non-linear basis on a per line basis, the 3D engine can also provide projection compensation based on a user requiring that the projection compensation parameter include image plane rotation to effect compensation. The 3D engine (or the CPU) performs conventional three dimensional plane angle rendering on a final image to in effect allow a flat projection surface to be virtually tilted by a plane rotation angle determined by a user through the user interface.

It will be recognized that the projector may also be placed on a right side or left side of a room so that correction in the vertical axis is suitable. As described above, the method and apparatus can scale an already rendered image such as a 2D image and scale the image for restorage in the frame buffer. Different ratiometric expansions can be formed on a line by line basis with a hardware non-uniform ratiometric expander, as desired. Accordingly, electronic scaling (i.e., correction) of an image prior to projection is provided. Horizontal correction may be employed, alternatively, vertical correction can be employed. In addition, instead of horizontal and vertical correction such as nonlinear scaling, an image plane angle is adjusted using a 3D engine to effect compensation for the pyramidal effect, or any other suitable effect caused by projecting an image on a projection surface.

It should be understood that the implementation of other variations and modifications of the invention in its various aspects will be apparent to those of ordinary skill in the art, and that the invention is not limited by the specific embodiments described. For example, receiving projection display compensation parameters includes pre-stored parameters stored in memory or fixed parameters such as when the angle of a projector may be fixed so that a user need not enter such data as it may be pre-stored or otherwise predefined for the apparatus. It is therefore contemplated to cover by the present invention, any and all modifications, variations, or equivalents that fall within the spirit and scope of the basic underlying principles disclosed and claimed herein.

What is claimed is:

1. A method for electronically compensating a projected image comprising the steps of:
    receiving projection display compensation parameters;
    performing projected image correction on image data from a frame buffer based on the received projection display compensation parameters to produce projection compensated image data; and
    storing the projection compensated image data back in the frame buffer.

2. The method of claim 1 including the step of outputting the projection corrected image for display on an image projection device.

3. The method of claim 1 wherein the image data is final image data and the projection compensated data is projection compensated final image data.

4. The method of claim 1 wherein the image data is partially processed image data and the projection compensated data is projection compensated partial image data.

5. The method of claim 1 wherein the projection display compensation parameters are received through a user interface and wherein the projection display compensation parameters include data representing at least one of an amount and direction of compensation, and an angle of image plane rotation to effect compensation.

6. The method of claim 1 wherein the step of performing projected image correction includes performing non linear scaling on a per line basis by a graphics rendering engine of the image data.

7. A method for electronically compensating a projected image comprising the steps of:
    receiving projection display compensation parameters;
    performing projected image correction based on the received projection display compensation parameters including the steps of obtaining stored final image data from frame buffer memory; performing scaling of the final image data to produce projection compensated final image data; and storing the projection compensated final image data back in frame buffer memory; and
    outputting a projection corrected image for display on an image projection device.

8. The method of claim of 7 wherein the projection display compensation parameters are received through a user interface and wherein the projection display compensation parameters include data representing at least one of an amount and direction of compensation, and an angle of image plane rotation to effect compensation.

9. The method of claim of 7 wherein the step of performing projected image compensation includes:
    performing non linear scaling on a per line basis by a graphics rendering engine of the final image data to produce projection compensated final image data.

10. An apparatus for electronically compensating a projected image comprising:
    a display controller;
    a projected image compensator operatively coupled to the display controller, and operative to receive projection display compensation parameters and perform projected image correction based on the received projection display compensation parameters; and
    a frame buffer operatively coupled to the projected image compensator, wherein the frame buffer stores image data, such that the projected image compensator may obtain the image data from the frame buffer and store projection compensated image data back in the frame buffer.

11. The apparatus of claim 10 wherein the projected image compensator outputs a projection corrected image for display on an image projection device.

12. The apparatus of claim 10 wherein the projected image compensator obtains final image data from frame buffer memory; performs scaling of the final image data to produce projection compensated final image data; and stores the projection compensated final image data back in the frame buffer memory.

13. The apparatus of claim 10 wherein the projected image compensator obtains partially processed image data from frame buffer memory; performs scaling of the final image data to produce projection compensated partial image data; and stores the projection compensated partial image data back in the frame buffer memory for further processing.

14. The apparatus of claim 10 wherein the projection display compensation parameters are received through a user interface and wherein the projection display compensation parameters include data representing at least one of an amount and direction of compensation, and an angle of image plane rotation to effect compensation.

15. The apparatus of claim 10 wherein the projected image compensator obtains partially processed image data from frame buffer memory; performs scaling of the final image data to produce projection compensated partial image data; and stores the projection compensated partial image data back in the frame buffer memory for further processing.

16. The apparatus of claim 10 wherein the display controller and the projected image compensator are part of a graphics processing device.

\* \* \* \* \*